United States Patent
Morita

(10) Patent No.: US 6,377,789 B2
(45) Date of Patent: Apr. 23, 2002

(54) WIRELESS SELECTIVE CALL RECEIVER WITH REDUCED POWER CONSUMPTION AT TIMES OF ABNORMAL RECEPTION

(75) Inventor: Kazuo Morita, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/085,087

(22) Filed: May 26, 1998

(30) Foreign Application Priority Data

Jun. 3, 1997 (JP) ............................................. 9-145603

(51) Int. Cl.[7] ................................................ H04B 1/16
(52) U.S. Cl. .................... 455/343; 455/574; 455/226.1; 340/7.33
(58) Field of Search ............................... 455/38.3, 38.1, 455/421, 422, 67.1, 574, 226.1, 343; 340/825.44, 7.33; 714/752

(56) References Cited

U.S. PATENT DOCUMENTS 5,396,660 A  *  3/1995  Cannon ....................... 455/343
5,507,039 A  *  4/1996  Honma ........................ 455/343
6,012,158 A  *  1/2000  Kurita et al. ................ 714/752

FOREIGN PATENT DOCUMENTS

JP          7-115674         5/1995

* cited by examiner

Primary Examiner—William Trost
Assistant Examiner—Philip Sobutka
(74) Attorney, Agent, or Firm—Scully, Scott, Murphy & Presser

(57) ABSTRACT

In a wireless selective call receiver, a receiving section receives an interleaved data signal sequentially in units of bits. The interleaved data signal is generated by interleaving a data composed of a plurality of words. The receiving section deinterleaves the received data signal to produced a deinterleaved data signal corresponding to the plurality of words, and detects a message from the deinterleaved data signal. A control unit stops an operation of the receiving section not to perform when a number of words containing BCH error bits equal to or more than a first predetermined number exceeds a second predetermined number.

12 Claims, 7 Drawing Sheets

WIRELESS SELECTIVE CALL RECEIVER WITH REDUCED POWER CONSUMPTION AT TIMES OF ABNORMAL RECEPTION

BACKGROUND OF THE INVENTION

1. Field of the Invention

The present invention relates to a wireless selective call receiver in which a power supply is turned off at the time of abnormal reception so that battery power consumption can be reduced.

2. Description of the Related Art

In a conventional wireless selective call receiver, when the data which is not interleaved is received and two continuing words of the data have BCH (binary decimal) code errors, the reception is determined to be abnormal so that a power supply of the receiving section is turned off.

Also, an interleaved data is recently transmitted so as to increase the access speed to a memory. In this case, the determination of the abnormal reception mentioned above based on the BCH error can not be performed because the data is deinterleaved into a plurality of words in the form of the BCH code at the reception side.

FIGS. 1A to FIG. 3 are the diagrams which show examples of the above-mentioned interleaving and deinterleaving operations.

First, one word is composed of x bits as shown in FIG. 1B, and one block is composed of y words as shown in FIG. 1A. In this case, the data is transmitted in the order from the first bit of the word 0, to the first bit of the word y, and subsequently from the second bit of the word 0 to the second bit of the word y, and then from the x-th bit of the word 0 to the x-th bit of the word 0 in the interleaving operating, as shown in FIG. 2. Thus, as shown in FIG. 3, even if the data containing errors is continuously received, error bits are distributed in each of words, when the interleaving state is eliminated, that is, the deinterleaving operation is performed. Here, error words or error bits are enclosed by square frames in FIGS. 2 and 3.

Therefore, the number of error bits within each word becomes small. That is, with the interleaved data, even if it supposes that any error is present over continuing words, the error data bits have been equally distributed into the respective word after the deinterleaving operation. Accordingly, the number of error bits becomes small in each word and each word is determined to be normal for the BCH code. Also, in the deinterleaved data, there is less case that the BCH errors continue because the error data bits are distributed in respective words in the deinterleaving operation.

In the reception of the data which is not interleaved, in the conventional wireless selective call receiver, the power supply of the receiving section is turned off, when two continuing words have BCH errors together. Therefore, there is a problem in that the power supply to the receiving section continue to be in the on state for a long time even if the data contains any BCH errors so that the battery lifetime becomes short.

Also, in the wireless selective call receiver in which interleaved reception data is deinterleaved, the number of error bits for every word becomes small. Accordingly, there is another problem in that the determination of reception data to be normal or abnormal can not be correctly implemented.

In addition, in Japanese Laid Open Patent Disclosure (JP-A-Heisei 7-115674), a wireless selective call receiver is described. In this reference, a receiving circuit is turned on only for frames corresponding to the receiver and when the same ID as that of the receiver is not found in the second word, the power supply to the receiving section is stopped.

SUMMARY OF THE INVENTION

The present invention is accomplished to solve the problems described above. An object of the present invention is to provide a wireless selective call receiver in which the determination of abnormal reception is performed when the number of words having error bits exceeds a predetermined value such that the abnormal reception is stopped.

Another object of the present invention is to provide a wireless selective call receiver in which the power supply to a receiving section is turned off to shorten the power supply on time in the abnormal reception, resulting in prolongation of battery life.

In order to achieve an aspect of the present invention, a wireless selective call receiver includes a receiving section for receiving an interleaved data signal sequentially in units of bits, the interleaved data signal being generated by interleaving a data composed of a plurality of words, for deinterleaving the received data signal to produced a deinterleaved data signal corresponding to the plurality of words, and for detecting a message from the deinterleaved data signal, and a control unit for stopping an operation of the receiving section not to perform when a number of words containing BCH error bits equal to or more than a first predetermined number exceeds a second predetermined number.

The wireless selective call receiver may further include a power source, and the control unit stops supply of power from the power source to the receiving section when the number of words containing error bits equal to or more than the first predetermined number exceeds the second predetermined number. The data includes a plurality of blocks, and the receiving operation by the receiving section is controlled to be performed or not to be performed in units of blocks.

Also, the control unit may include a BCH error detecting circuit for detecting the BCH error bits of each of the plurality of words corresponding to the deinterleaved data signal, an error word counter for counting the words as error words having the BCH error bits equal to or more than the first predetermined value, a comparing section for comparing the second predetermined value and the count value of the error words, and an operation control circuit for stopping the operation of the receiving section when it is determined that the count value of the error words exceeds the second predetermined value. The wireless selective call receiver may further include a power source. In this case, the operation control circuit stops supply of power from the power source to the receiving section when it is determined that the count value of the error words exceeds the second predetermined value. Also, the data includes a plurality of blocks, and the receiving operation by the receiving section is controlled to be performed or not to be performed in units of blocks.

In order to achieve another aspect of the present invention, a method of controlling a receiving operation in a wireless selective call receiver, includes the steps of:

receiving an interleaved data signal sequentially in units of bits, the interleaved data signal being generated by interleaving a data composed of a plurality of words;

deinterleaving the received data signal to produced a deinterleaved data signal corresponding to the plurality of words;

detecting a message from the deinterleaved data signal;

stopping an operation of the receiving section not to perform when a number of words containing BCH error bits equal to or more than a first predetermined number exceeds a second predetermined number.

DESCRIPTION OF THE PREFERRED EMBODIMENT

A wireless selective call receiver of the present invention will be described with reference to the attached drawings.

Figure 1A:
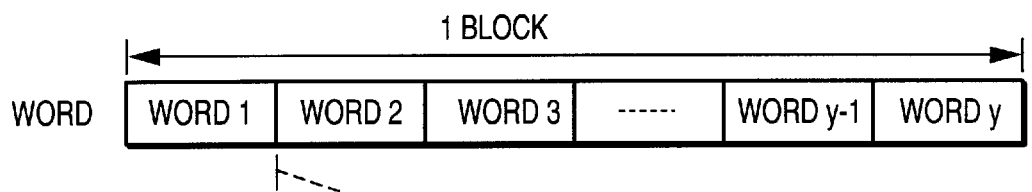
FIGS. 1A and 1B are diagrams illustrating the structure of a data to be transmitted in a conventional wireless selective call receiver.
Figure 1B:
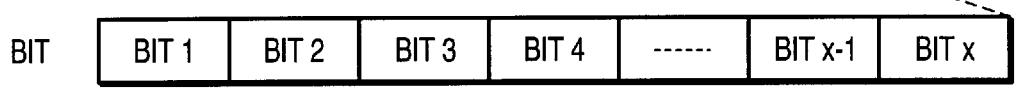
Figure 2:
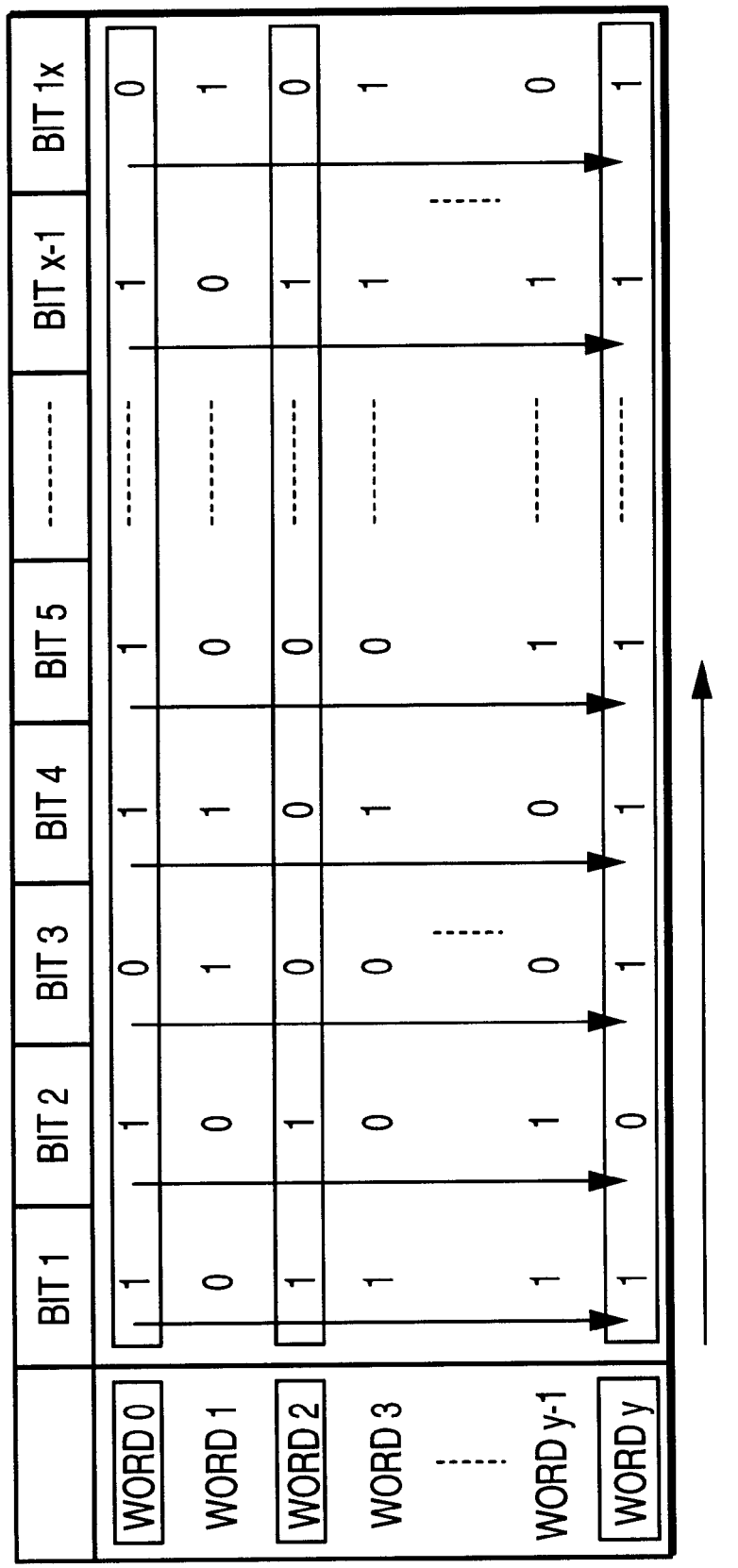
FIG. 2 is a diagram illustrating the transmission pattern in an interleaving operation.
Figure 3:
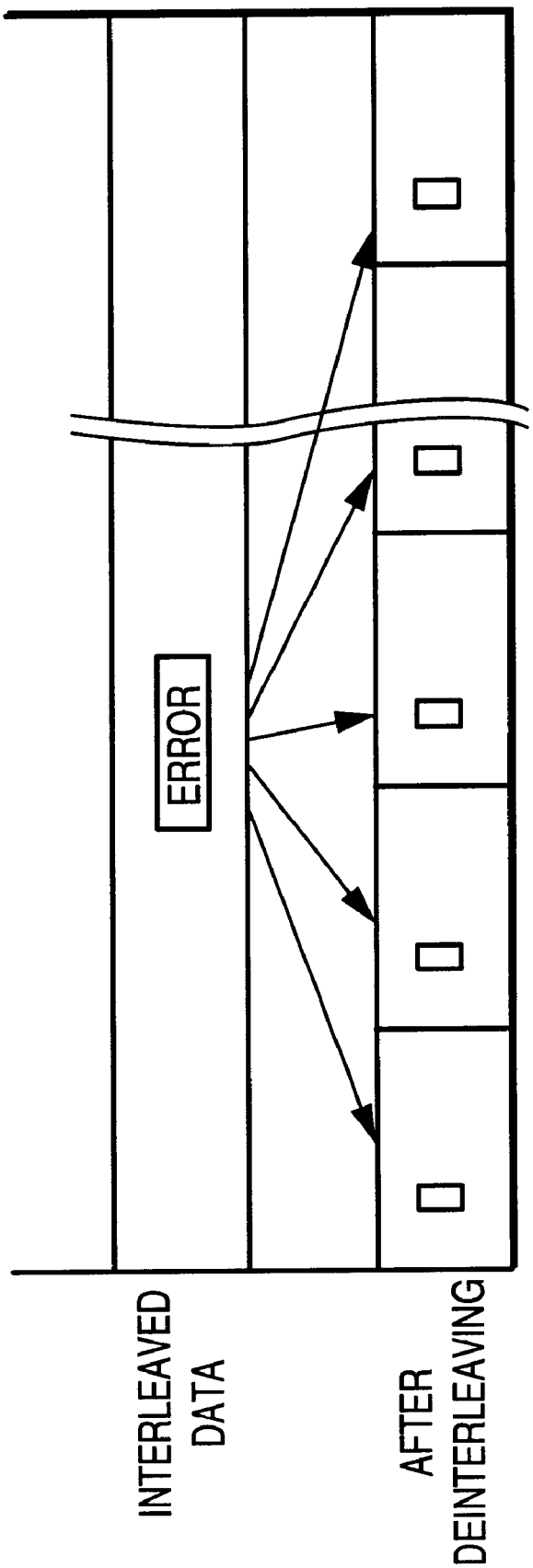
FIG. 3 is a diagram illustrating relation between an interleaved reception data and a deinterleaved data.
Figure 4:
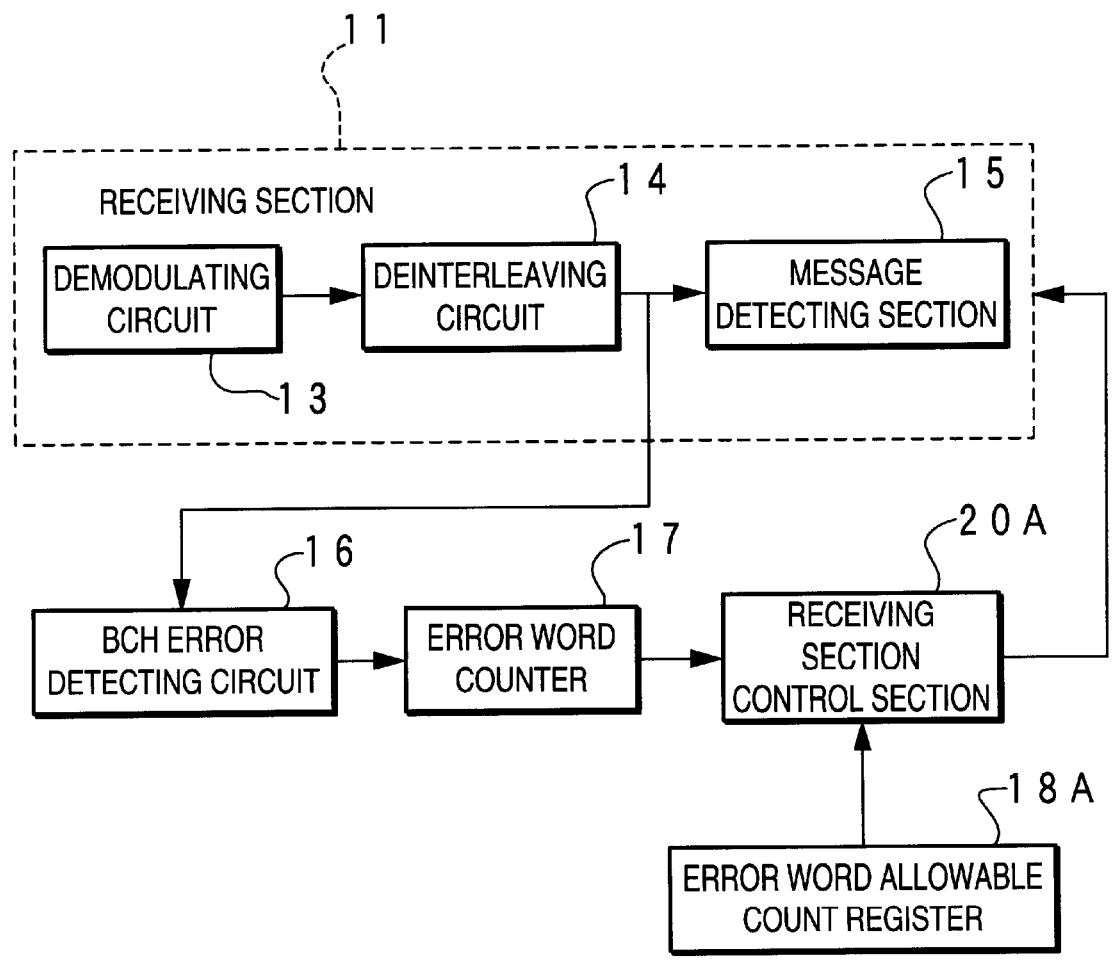
FIG. 4 is a block diagram illustrating the basic principle of the wireless selective call receiver of the present invention.

FIG. 4 is a block diagram illustrating the basic principle of the wireless selective call receiver of the present invention. Referring to FIG. 4, the wireless selective call receiver is composed of a receiving section 11 which includes a demodulating circuit 13, a deinterleaving circuit 14 and a message detecting section 15, a BCH error detecting circuit 16, an error word counter 17, a reception section control section 20A and a register 18A for an error word allowable count.

The demodulating circuit 13 demodulates interleaved data from a transmission station to output as a digital demodulated signal. The deinterleaving circuit 14 deinterleaves the demodulated signal into data composed of a plurality of words. The message detecting section 15 detects a message sent to a pager user from the deinterleaved data.

Also, the BCH error detecting circuit 16 detects any BCH error for every word. The error word counter counts the number of words (n), each of which has BCH error bits equal to or more than n bits. The BCH error bits are detected by the BCH error detecting circuit 16. The error word allowable count register 18A in which the number m of error words which is allowed in one block is set in advance. The receiving section control section operates to turn off the power supply to the receiving section 11 when the count value (n) by the error word counter exceeds the number of permissible error words (m).

According to this structure, the data signal received by the receiving section 11 is demodulated by the demodulating circuit 13, and then is supplied to the deinterleaving circuit 14. The deinterleaving circuit 14 deinterleaves the demodulating data signal to produce a plurality of words in the form of the BCH codes. A part of the deinterleaved data is supplied to the message detecting section 15 which performs the detection of the message. On the other hand, another part of the deinterleaved data is supplied to the BCH error detecting circuit 16 which detects any BCH error. In this case, the number of error words, each of which has BCH error bits equal to or more than n bits is counted by the error word counter 17. When the count value (n) exceeds the error word allowable count (m) set in the error word allowable count register 18A, the receiving section control section 20A temporarily stops the power supply to the receiving section 11 such that the receiving operation of the receiving section 11 is stopped.

Figure 5:
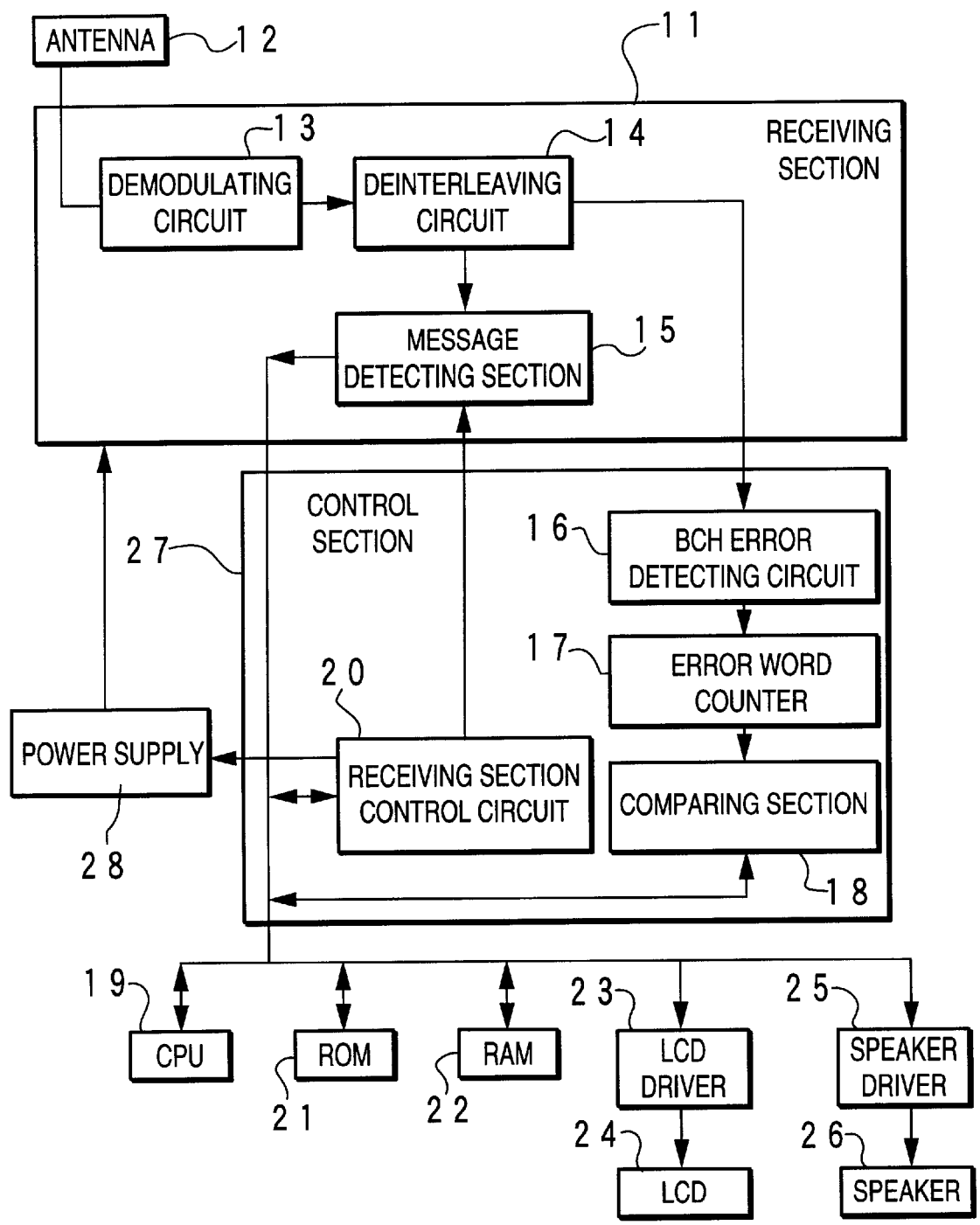
FIG. 5 is a block diagram illustrating the structure of the wireless selective call receiver according to an embodiment of the present invention.
Figure 6:
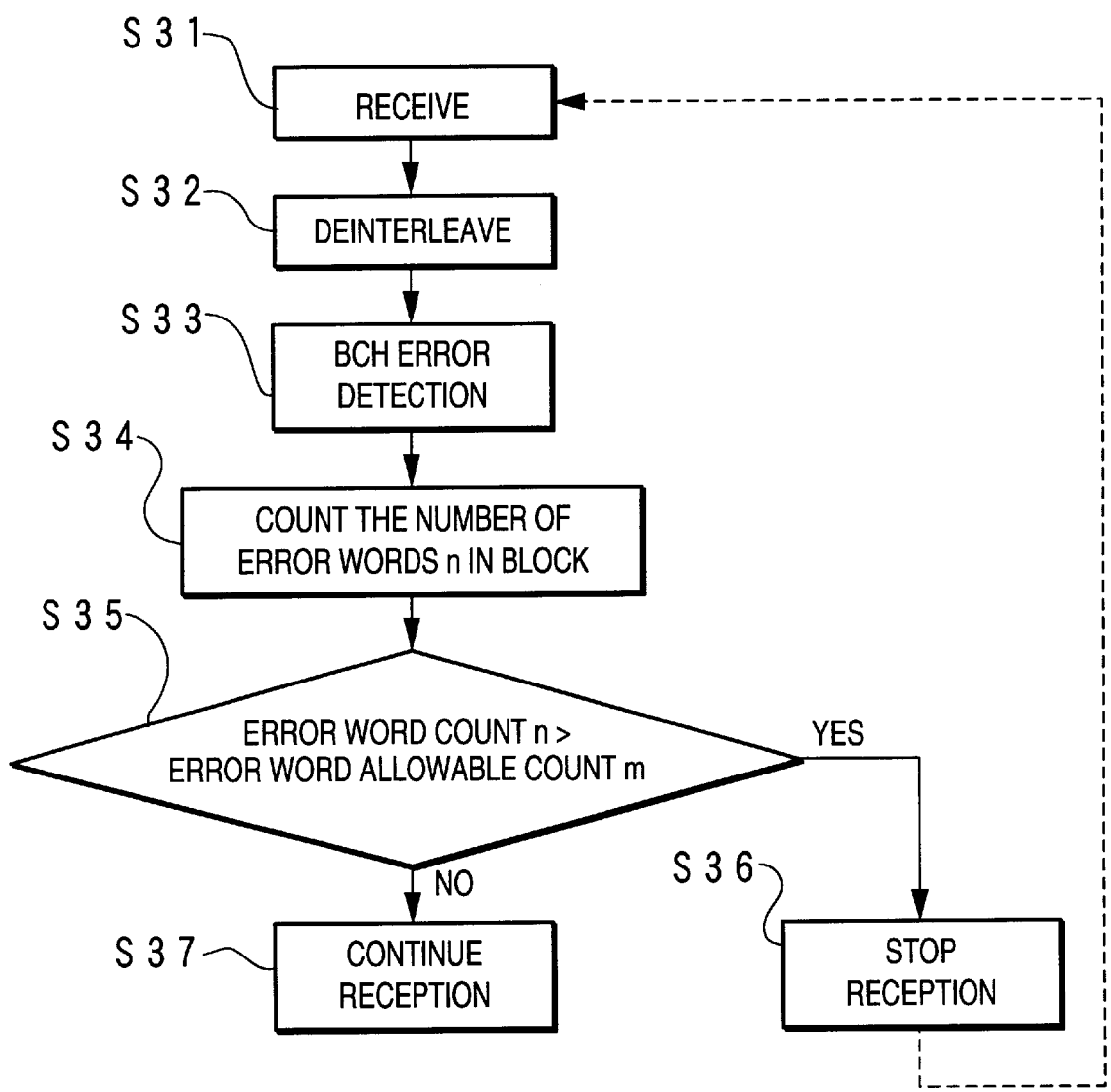
FIG. 6 is a flow chart illustrating the operation of the wireless selective call receiver according to the embodiment of the present invention.

FIG. 5 is a block diagram illustrating the structure of the wireless selective call receiver according to an embodiment of the present invention. In FIG. 5, the same components as shown in FIG. 4 are allocated with the same reference numerals as in FIG. 4 and the description will be omitted.

Referring to FIG. 5, the wireless selective call receiver is composed of an antenna 12, a receiving section 11, a control section 27, a CPU 19, a ROM 21, a RAM 22, an LCD driver 23, an LCD, a speaker driver 25, a speaker 26 and a power supply 28. The receiving section 11 includes a demodulating circuit 13, a deinterleaving circuit 14 and a message detecting section 15. The control section 27 includes a BCH error detecting circuit 16, an error word counter 17, a receiving section control section 20 and a register 18 for an error word allowable count.

The receiving section 11 is same as described above. The antenna 12 is used to receive an interleaved data signal from a transmission station. The demodulating circuit 13 demodulates the data signal received by the antenna 12 to output as a digital demodulated data signal. The deinterleaving circuit 14 deinterleaves the modulated data signal to produce the reception data composed of a plurality of words, as described above. The message detecting section 15 detects a message from the deinterleaved reception data. The BCH error detecting circuit 16 detects any BCH error for every word.

The error word counter of the control section 27 counts the number of error words (n), each of which has BCH error bits equal to or more than n bits. The error word is detected by the BCH error detecting circuit 16. The comparing section 18 compares the number of error words (n) counted by the error word counter 17 and a predetermined error word allowable count (m) for one block. The comparing section 18 outputs an abnormal reception occurrence signal to a microprocessor (hereinafter, to be referred to as a CPU 19) in case of n>m. The abnormal reception occurrence signal is not generated in case of n≦m. The receiving section control circuit 20 controls the power supply 28 under the control of the CPU 19 such that the receiving operation of the receiving section 11 is stopped. Thus, the function to stop the receiving operation of the receiving section 11 and the function to turn off the power supply are accomplished. Also, the ROM 21 stores a processing program for the CPU 19 and data necessary for the receiver. The RAM 22 stores the received message detected by the message detecting section 15. The liquid crystal display (LCD) 24 displays a data. The LCD driver 23 drives the LCD 24 under the control by the CPU 19. The speaker driver 25 drives a speaker 26. The LCD 24, the LCD driver 23, the speaker 26 and the speaker driver 25 function as they output the message in the form of an image, characters, speech and so on.

Next, the operation will be described with reference to a flow chart of FIG. 6 and FIGS. 7A to 7C.

Figure 7A:
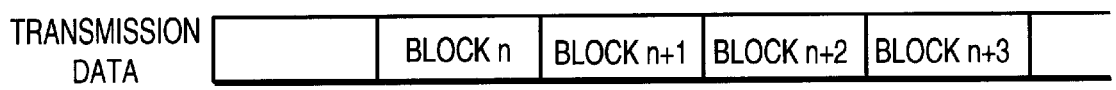
FIGS. 7A to 7C are time charts illustrating the reception data and power supply states in the present invention.
Figure 7B:
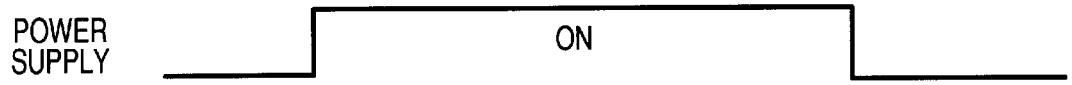

First, the CPU 19 issues an instruction the receiving section control circuit 20 such that the receiving section 11 starts the receiving operation. In response to the instruction from the CPU 19, the receiving section control circuit 20 controls the power supply 28 to be turned on, as shown in FIG. 7B. Also, the receiving section control circuit 20 controls the demodulating circuit 13, the deinterleaving circuit 14 and the message detecting circuit 15 to operate to start the reception operation (Step S31). For this reason, the data received by the antenna 12 as shown in FIG. 7A is outputted to the deinterleaving circuit 14 through the demodulating circuit 13. The deinterleaving circuit 14 releases the interleaving state of the interleaved data to produce a plurality of words in the form of BCH codes (Step S32).

The message detecting section 15 extracts the message, which has been sent to the pager user, from the deinterleaved data. When there is a message for the user, the message detecting section 15 outputs a message detection signal to the CPU 19. The CPU 19 transfers the detected message from the message detecting section 15 to the RAM 22. After all of the messages to the user are transferred to the RAM 22, the CPU 19 instructs the speaker driver 25 to inform the reception of the message. The speaker driver 25 drives the speaker 26 in response to the instruction from the CPU 19 to inform the arrival of the message. Also, at the same time as the information of the arrival of the message by the speaker 26, the CPU 19 instructs the LCD driver 23 to display the content of the message stored in the RAM 22. The LCD driver 23 drives the LCD 24 in response to the instruction from the CPU 19 to display the message stored in the RAM 22 on LCD 24.

After all the data are searched by the message detecting section 15, the CPU 19 generates an instruction to the receiving section control circuit 20 such that the reception operation is stopped, as shown in FIG. 7B.

On the other hand, in the present invention, the detection of error data is performed at the same time as the message detecting operation and the message outputting operation such that the data containing many errors is excluded before all the data are received or searched. Thus, the operation time of the receiving section is made short and the battery lifetime is made long. That is, the BCH error detecting circuit 16 detects any BCH error from words after the deinterleaving operation by the deinterleaving circuit 14 for each word (Step S33). When detecting any BCH error word, the BCH error detecting circuit 16 outputs the BCH error detection signal to the error word counter 17. The error word counter 17 counts the number of error words, each of which has BCH error bits equal to or more than n bits, i.e., a predetermined number of bits. The BCH error bits are detected by the BCH error detecting circuit 16 (Step S34). Then, the error word counter 17 outputs the count value (n) to the comparing section 18.

Figure 7C:

On the other hand, the comparing section 18 compares the preset error word allowable count (m) for one block and the count value (n) from the error word counter 17 (Step S35). In case of n>m, the comparing section 18 outputs an abnormal reception occurrence signal to the CPU 19. The CPU 19 receives the abnormal reception occurrence signal from the comparing section 18, and issues an instruction to the receiving section control circuit 20 such that the reception operation is stopped. The receiving section control circuit 20 controls the power supply 28 to be turned off such that the receiving operation is stopped (Step S36), as shown in FIG. 7C. On the other hand, the comparing section 18 controls to continue the receiving operation in case of n≦m (Step S37).

In this way, because the reception of the data that has the high possibility of error occurrence is stopped, the power supply on time of the receiving section can be decreased and the battery lifetime can be prolonged. In the condition in which an error bit could be easy to be added as in an area other than the reception area or the inside of the building where a transmission wave becomes weak in intensity, the error bit is added to the whole message. However, as shown in FIG. 7A, there is a case where a communication data is present in blocks (n) to (n+2) and an error is contained in the whole message. In such a case, the power supply is turned off not after the error of block (n+2) is determined as shown in FIG. 7B, but after the error of block (n) as the head block is determined as shown in FIG. 7C. Therefore, the power is not consumed in the continuing blocks (n+1) and (n+2) and the battery lifetime can be prolonged.

The error word allowable count may be set by the user through an operation of an input section (not shown).

As mentioned above, according to the present invention, the wireless selective call receiver is constructed to be composed of the receiving section for receiving a signal of an interleaved data, using the data composed of a plurality of words as one block, the deinterleaving circuit for deinterleaving the signal received and demodulated by the receiving section, the BCH error detecting circuit for detecting a BCH error of each word based on the output of the deinterleaving circuit, and the error word counter for counting the number of error words of the block, each of error words having BCH error bits equal to or more than n bits. Also, the comparing section compares the error word allowable count for one block and the number of error words and power supply to the receiving section is stopped when it is determined that the number of error words exceeds the number of error word allowable count. Therefore, when words more than the error word allowable count has any errors in the block of interleaved data, it is determined that the subsequent blocks of data contain many errors so that the reception can be stopped. As a result, the power supply on time to the receiving section can be reduced. Thus, the effect can be accomplished that it is possible to prolong the battery lifetime.

What is claimed is:

1. A wireless selective call receiver comprising:
   a receiving section for receiving an interleaved data signal sequentially in units of bits, the interleaved data signal being generated by interleaving a data composed of a plurality of words, for deinterleaving the received data signal to produce a deinterleaved data signal corresponding to the plurality of words, and for detecting a message from said deinterleaved data signal; and
   a control unit for stopping an operation of said receiving section when a number of words containing BCH error bits equal to or more than a first predetermined number exceeds a second predetermined number,
   wherein said stopping of operation can be performed during stand-by operation, during intermittent reception and during communication operation.

2. A wireless selective call receiver according to claim 1, wherein further comprising a power source, and
   wherein said control unit stops supply of power from said power source to said receiving section when the number of words containing error bits equal to or more than the first predetermined number exceeds the second predetermined number.

3. A wireless selective call receiver according to claim 1, wherein said data comprises a plurality of blocks, and the receiving operation by said receiving section is controlled to be performed or not to be performed in units of blocks.

4. A wireless selective call receiver according to claim 1, wherein said control unit comprises:

a BCH error detecting circuit for detecting the BCH error bits of each of the plurality of words corresponding to said deinterleaved data signal;

an error word counter for counting the words as error words having the BCH error bits equal to or more than the first predetermined value;

a comparing section for comparing the second predetermined value and the count value of the error words; and an operation control circuit for stopping the operation of said receiving section when it is determined that the count value of the error words exceeds the second predetermined value.

5. A wireless selective call receiver according to claim 4, wherein further comprising a power source, and wherein said operation control circuit stops supply of power from said power source to said receiving section when it is determined that the count value of the error words exceeds the second predetermined value.

6. A wireless selective call receiver according to claim 4, wherein said data comprises a plurality of blocks, and the receiving operation by said receiving section is controlled to be performed or not to be performed in units of blocks.

7. A method of controlling a receiving operation in a wireless selective call receiver, comprising the steps of:

receiving an interleaved data signal sequentially in units of bits, the interleaved data signal being generated by interleaving a data composed of a plurality of words;

deinterleaving the received data signal to produce a deinterleaved data signal corresponding to the plurality of words;

detecting a message from said deinterleaved data signal;

stopping an operation of said receiving section when a number of words containing BCH error bits equal to or more than a first predetermined number exceeds a second predetermined number wherein said stopping of operation can be performed during stand-by operation, during intermittent reception and during communication operation.

8. A method according to claim 7, wherein said stopping step includes stopping supply of power from said power source to said receiving section when the number of words containing error bits equal to or more than the first predetermined number exceeds the second predetermined number.

9. A method according to claim 7, wherein said data comprises a plurality of blocks, and said stopping step includes stopping the receiving operation in units of blocks.

10. A method according to claim 7, wherein said stopping step includes:

detecting the BCH error bits of each of the plurality of words corresponding to said deinterleaved data signal;

counting the words as error words having the BCH error bits equal to or more than the first predetermined value;

comparing the second predetermined value and the count value of the error words; and stopping the operation of said receiving section when it is determined that the count value of the error words exceeds the second predetermined value.

11. A method according to claim 9, wherein said stopping step includes stopping supply of power from said power source to said receiving section when it is determined that the count value of the error words exceeds the second predetermined value.

12. A method according to claim 9, wherein said data comprises a plurality of blocks, and said stopping step includes stopping the receiving operation in units of blocks.

* * * * *